March 29, 1938. L. J. VETRANO 2,112,352
COUPLING
Filed Nov. 23, 1936 2 Sheets-Sheet 1
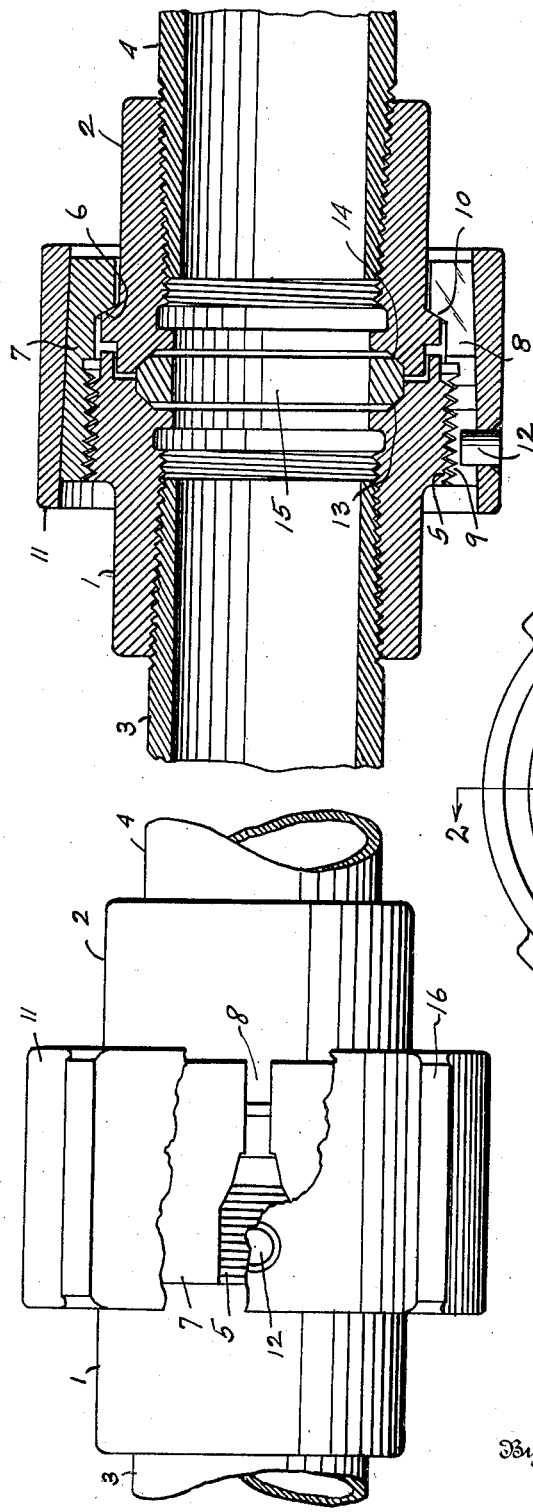
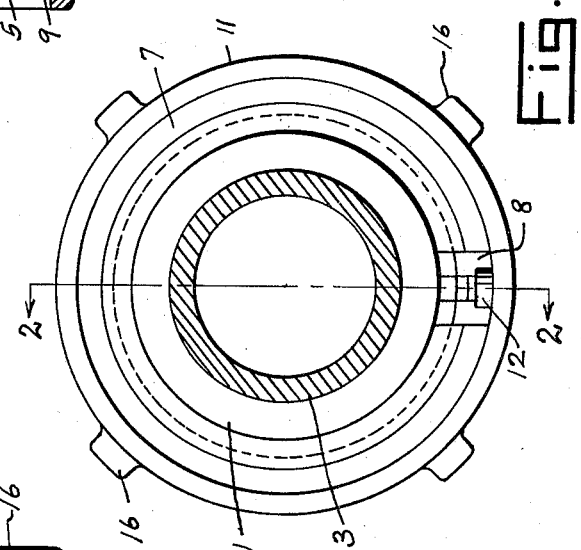
Inventor
Leon J. Vetrano.
By Edward V. Hardway
Attorney March 29, 1938.  L. J. VETRANO  2,112,352
COUPLING
Filed Nov. 23, 1936  2 Sheets-Sheet 2
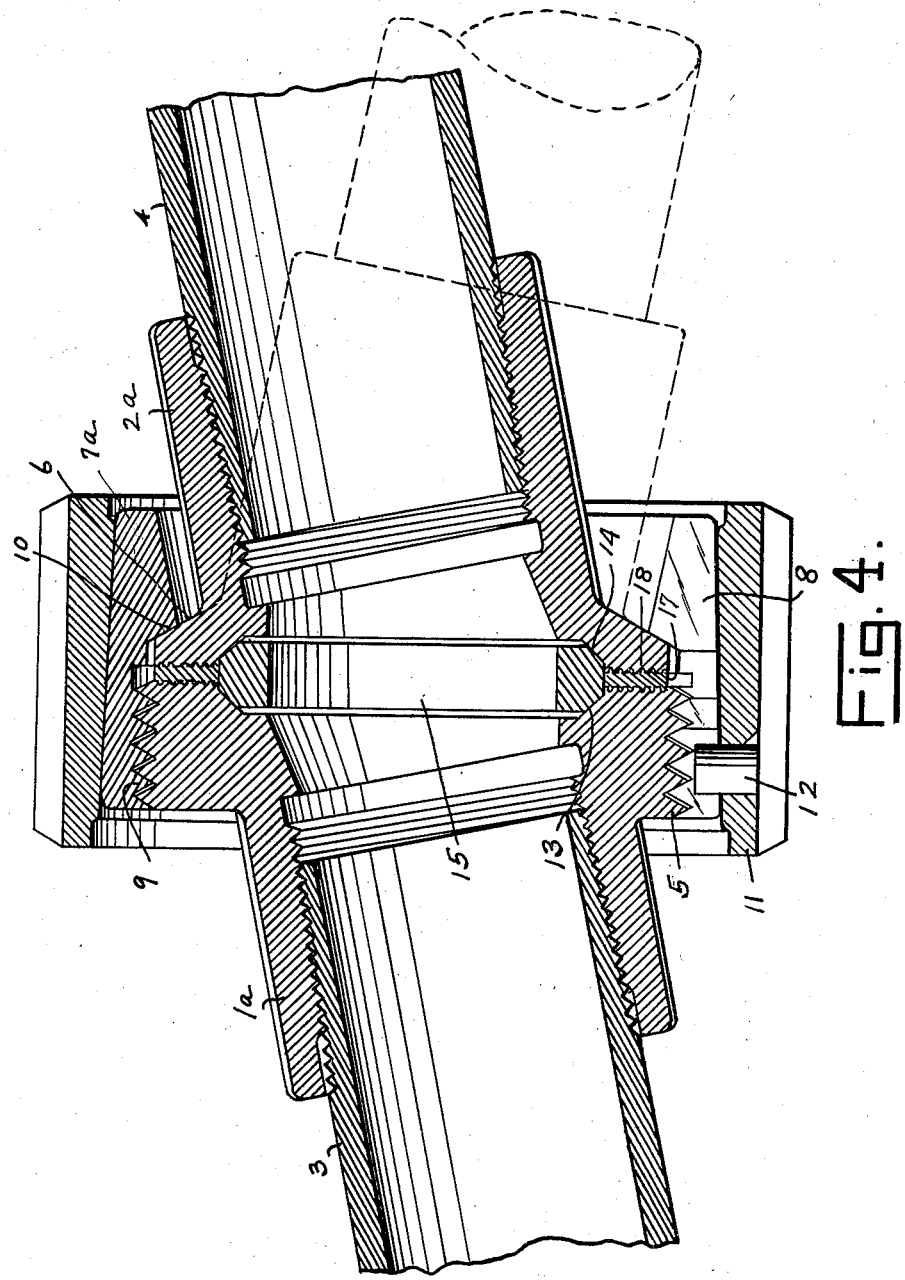
Inventor
Leon J. Vetrano
By Edward V. Hardway,
Attorney Patented Mar. 29, 1938

2,112,352

UNITED STATES PATENT OFFICE 2,112,352

COUPLING

Leon J. Vetrano, Houston, Tex.

Application November 23, 1936, Serial No. 112,268

4 Claims. (Cl. 285—129)

This invention relates to a coupling.

An object of this invention is to provide a coupling of the character described whereby adjacent sections of pipe or rod or other similar sections may be quickly and easily coupled together.

It is another object of the invention to provide a coupling for connecting adjacent sections of pipe or tubing in such manner as to form a leak proof joint between them.

It is a further feature of the invention to provide a coupling comprising two coupling members, one provided with an external annular tapering face and the other with external threads with a contractile clamp ring having inside threads to engage the external threads of one coupling member and an inside tapering face to engage the tapering face of the other coupling member and a wedge ring adapted to be wedged about the clamp ring to contract the same whereby the coupling members will be drawn closely together to form a fluid tight joint.

A still further object of the invention is to provide in a coupling a wedge ring and a clamp ring so assembled together as to prevent their complete separation for convenience in handling and which have the necessary relative movement to effect the clamping, or release of the clamp ring.

It is still another object of the invention to provide a construction of the character described of such design that the connected sections either of a pipe or of a rod may assume angular relations with respect to each other and yet a fluid tight joint between them be formed.

The invention is illustrated as applied to a union between tubular sections although the invention may be applied for the purpose of connecting rod sections as well.

With the above and other objects in view the invention has particular relation to certain novel features of construction, arrangement of parts and use, an example of which is given in this specification and illustrated in the accompanying drawings, wherein:

Figure 1 shows an elevational view of the coupling partly broken away.

Figure 2 shows a longitudinal sectional view taken on the line 2—2 of Figure 3.

Figure 3 shows an end view of the coupling and

Figure 4 shows a longitudinal sectional view of another form of the coupling.

Referring now more particularly to the drawings wherein like numerals of reference designate the same parts in each of the figures the numerals 1 and 2 respectively designate adjacent coupling members to which the connected sections of pipe 3 and 4 are attached preferably by means of screw threads as shown.

The adjacent ends of the coupling members 1, 2 are enlarged or thickened outwardly. The thickened portion of the coupling member 1 is provided with the external threads 5 and the thickened portion of the coupling member 2 is provided with an external tapering face 6.

Around these adjacent ends is the contractile clamp ring or sleeve 7. This sleeve is split at one side having the slot 8 so that it will be contractile. At one end the sleeve is provided with the inside threads 9 adapted to mesh with the external threads 5 of the coupling member 1. The inside diameter of the threads 9 is slightly greater than the external diameter of the enlarged end of the coupling 2 so as to readily pass thereover. The other end of the clamp ring 7 is inwardly thickened and formed with a tapering face 10 arranged to contact with the tapering face 6 of the coupling member 2. The inside of the inwardly thickened portion of the clamp ring 7 is slightly greater than the outside diameter of the coupling member 2 to permit the contraction of said clamp ring.

The external surface of the clamp ring 7 is slightly tapered, being of a slightly larger external diameter at its threaded end than at its opposite end as is shown in Figure 2 and a wedge ring 11 is adapted to be wedged thereover.

The wedge ring 11 has an inwardly extended stud 12 welded or otherwise secured thereto whose inner end projects into the slot 8. This slot is widened at one end as shown in Figure 1 to readily receive the stud but at its other end the slot is narrower than the diameter of the stud for a purpose to be hereinafter explained.

In a preferred construction of the coupling the adjacent ends of the coupling members 1 and 2 have the inside, outwardly converging faces 13 and 14 and a seal ring 15 is disposed within said ends and has external tapering faces to fit against the corresponding faces 13 and 14.

In assembly the wedge ring 11 may be fitted over the clamp ring 7 and the stud 12 then welded or otherwise secured in place, projecting into the widened end of the slot 8. The wedge ring may then be moved to carry the stud to the narrow end of the slot 8 to permit the maximum expansion of the clamp ring 7 and the assembly may then be slipped over the coupling member 2 before said coupling member is attached to the pipe section 4 and the ring 15 may then be inserted into place and the coupling members 1 and 2 brought into alignment and the clamp ring 7 may then be screwed onto the coupling member 1 by hand, or by the application of a wrench or a hammer may be used for making up the threads, the external lugs 16 being provided on the wedge ring for that purpose. This will draw the coupling members 1 and 2 closely together, the tapering face 10 will then bear against the tapering face 6 and the sides of the threads 9, facing toward the joint between the coupling members, will engage against the opposing sides of the threads 5 as clearly illustrated in Figure 2. The wedge ring 11 may then be driven more tightly onto the clamp ring 7 contracting said clamp ring and causing the coaction between the faces 6 and 10 and between the contacting face of said threads to draw the coupling members 1 and 2 more closely together so as to form a leak proof joint.

When it is desired to release the clamp 7 and separate the coupling members, the wedge ring 11 may be driven in the opposite direction carrying the stud 12 toward the narrow end of the slot 8 and this will permit the clamp ring 7 to expand so that it may be easily unscrewed. It will thus be noted that the wedge 11 has a sufficient range of movement to cause the contraction of or permit the expansion of the clamp ring 7, but it will at all times remain assembled with said clamp ring thus forming a very convenient type of coupling.

In the form shown in Figure 4 the coupling members 1a and 2a are employed to connect the pipe sections 3, 4. They have the inside ring 15 provided with outer tapering faces which contact with the inside faces 13, 14, as is shown in Figure 2. In this form between the facing ends of the coupling is the annular washer 17 which surrounds the ring 15 and which is formed of suitable soft metal so as to flow into depressions 18 in the facing ends of the coupling members 1a, 2a when said coupling members are drawn together.

In this form the adjacent ends of the coupling members 1a and 2a are enlarged or thickened outwardly and said coupling member 1a is provided with the external threads 5 to intermesh with the internal threads 9 of the clamp ring 7a. The wedge ring 11 is fitted over the clamp ring 7a in a manner similar to that explained in connection with the forms shown in Figures 1 to 3 inclusive and is provided with the stud 12 which projects into the slot 8 as indicated in Figure 4. The clamp ring 7a has the inside sloping face 10 adapted to ride against the external sloping face 6 of the coupling member 2a, as in the other figures. In this form the outer ends of the coupling members 1a, 2a, are disposed angular with respect to the axis of the joint ring 15 so that they may be disposed in alignment as indicated in full lines in Figure 4 or in angular relation to each other in the manner indicated by the dotted lines in said figures to the end that sections of pipe either in alignment or out of alignment may be readily coupled together.

The coupling shown in Figure 4 may be assembled or separated in the manner hereinabove explained in connection with the forms shown in Figures 1 to 3 inclusive.

The drawings and description disclose what is now considered to be preferred forms of the invention by way of illustration only, while the broad principle of the invention will be defined by the appended claims.

What I claim is:—

1. A coupling comprising two coupling members, whose ends are arranged adjacent, one of said ends having external threads and the other of said ends having an external tapering face, a contractile clamp ring having threads at one end which mesh with the threads of one coupling member, the other end of said ring having an inside tapering face which engages the tapering face of said other coupling member when said ring is screwed home, said ring having a longitudinal slot, a wedge ring on the clamp ring for contracting said clamp ring whereby said threads and said co-acting tapering faces will be rendered effective to draw the coupling members together and a projection on the wedge ring extended into the slot.

2. A coupling comprising two coupling members, the adjacent ends of said coupling members being externally enlarged, one of said enlarged ends being provided with external threads and the other enlarged end being provided with an annular tapering face, an expansible, one piece, clamp ring having internal threads at one end which mesh with the threads on one coupling member and the other end of said ring having an inside tapering face which engages the tapering face of the other coupling member when said clamp ring is screwed home, said clamp ring having a tapering exterior, a wedge ring having an inside taper to correspond to the outside taper of the clamp ring, said wedge ring being driven on to the clamp ring whereby said threads and said co-acting tapering faces will be rendered effective to draw the coupling members together, said rings being provided with interengaging means whereby they will be maintained in assembled relation.

3. A coupling comprising two coupling members, the adjacent ends of said coupling members being externally enlarged, one of said enlarged ends being provided with external threads and the other enlarged end being provided with an annular tapering face, an expansible, one piece, clamp ring having internal threads at one end which mesh with the threads on one coupling member and the other end of said ring having an inside tapering face which engages the tapering face of the other coupling member when said clamp ring is screwed home, said clamp ring having a tapering exterior, a wedge ring having an inside taper to correspond to the outside taper of the clamp ring, said wedge ring being driven on to the clamp ring whereby said threads and said co-acting tapering faces will be rendered effective to draw the coupling members together, said rings being provided with interengaging means whereby they will be maintained in assembled relation, said interengaging means being arranged to allow a limited longitudinal movement of the rings relative to each other.

4. A coupling comprising two coupling members whose ends are arranged adjacent, one of said ends having external threads and the other of said ends having an external tapering face, a clamp ring having threads at one end which mesh with the threads of the coupling member, the other end of said ring having an inside tapering face which engages the tapering face of the other coupling member when the ring is screwed home, a wedge ring on the clamp ring for contracting said clamp ring whereby said threads and said co-acting tapering faces will be rendered effective to draw the coupling members together, said wedge ring and clamp ring being provided one with a longitudinal slot and the other with a projection extended into the slot whereby to allow a limited longitudinal movement of the rings relative to each other and whereby said rings will be maintained in assembled relation.

LEON J. VETRANO.